(12) United States Patent
Huang et al.

(10) Patent No.: US 9,545,719 B2
(45) Date of Patent: Jan. 17, 2017

(54) TEACHING DEVICE AND METHOD FOR ROBOTIC ARM

(71) Applicant: QUANTA STORAGE INC., Taoyuan County (TW)

(72) Inventors: Chung-Hsien Huang, Taoyuan County (TW); Shih-Chih Ho, Taoyuan County (TW)

(73) Assignee: QUANTA STORAGE INC., Taoyuan County (TW)

( * ) Notice: Subject to any disclaimer, the term of this patent is extended or adjusted under 35 U.S.C. 154(b) by 0 days.

(21) Appl. No.: 14/564,944

(22) Filed: Dec. 9, 2014

(65) Prior Publication Data

US 2015/0217450 A1 Aug. 6, 2015

(30) Foreign Application Priority Data

Feb. 5, 2014 (TW) .............................. 103103879 A

(51) Int. Cl.
*B25J 9/16* (2006.01)
(52) U.S. Cl.
CPC .... *B25J 9/1671* (2013.01); *G05B 2219/35444* (2013.01)

(58) Field of Classification Search
CPC ....................... G05B 2219/35444; B25J 9/163
See application file for complete search history.

(56) References Cited

U.S. PATENT DOCUMENTS

| 2011/0118877 | A1* | 5/2011 | Hwang | .................... B25J 13/00 |
| | | | | 700/264 |
| 2013/0211592 | A1* | 8/2013 | Kim | .......................... B25J 3/00 |
| | | | | 700/258 |

* cited by examiner

*Primary Examiner* — Yuen Wong
(74) *Attorney, Agent, or Firm* — Rabin & Berdo, P.C.

(57) ABSTRACT

A teaching device and a teaching method for a robotic arm are disclosed. The teaching device comprises a robotic arm, a control device and a gesture recognition module. The gesture recognition module detects a control gesture signal and transmits the detected control gesture signal to the control device. After receiving the control gesture signal, the control device teaches the robotic arm to move and switches between an arm movement mode and a hand movement mode. In an arm movement mode, the control device, aided by an arm ambient image shown on an eye frame and an arm control gesture, teaches an arm unit to move to a target at a high velocity. In the hand movement mode, the control device, aided by a hand vicinity image shown on an eye-in-hand frame and a hand control gesture, teaches a hand unit to move the processing target at a low velocity.

6 Claims, 4 Drawing Sheets

 The wake-up gesture is a waving opened hand for waking up the robot arm 10. In the arm movement mode, the wake-up gesture is shown in the eye-to-hand frame

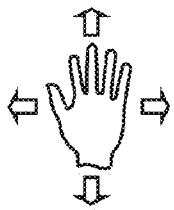 The arm gesture is an opened hand moving up and down and to both sides. The arm gesture is used for driving the arm unit 11 to move in the arm movement mode, and is shown in the eye-to-hand frame

 The conversion gesture is a closed hand with the thumb and the index finger being stretched out for activating the conversion of the movement mode and switching the control device between the arm movement mode and the hand movement mode. The conversion gesture appears in the frame following the conversion of the movement mode

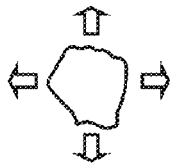 The moving gesture is a clenched fist moving up and down and to both sides for moving the hand unit to adjust the direction in the hand movement mode. The moving gesture appears in the frame following the conversion of the movement mode and is shown in the eye-in-hand frame

 The gripping gesture is a half-closed hand with the thumb being separated from four clenched fingers for moving the hand unit to grip the work piece in the hand movement mode

 The releasing gesture is an opened hand for opening the hand unit to release the work piece in the hand movement mode

 The completion gesture: the movement mode is terminated and gesture in the eye-to-hand or the eye-in-hand frame disappear with the middle finger and the index finger

FIG. 3

TEACHING DEVICE AND METHOD FOR ROBOTIC ARM

This application claims the benefit of Taiwan application Serial No. 103103879, filed Feb. 5, 2014, the subject matter of which is incorporated herein by reference.

BACKGROUND OF THE INVENTION

Field of the Invention

The invention relates in general to a teaching device and a teaching method for a robotic arm, and more particularly to a teaching device and a teaching method for a robotic arm capable of remotely teaching the robotic arm to move by means of a vision device.

Description of the Related Art

Along with the rapid development in the manufacturing technologies, many production lines have replaced human labor with robotic arms to increase the speed of mass production, stabilize product quality and reduce labor cost. With the production configuration which allows one operator to monitor several robotic arms, production efficiency and market competiveness of the products can both be increased.

The robotic arm is normally moved at a high velocity to increase production efficiency. However, the robotic arm moving at a high velocity is hazardous to the operator operating the robotic arm within a short distance. Particularly, in a working environment with hazardous factors such as radiation, high temperature, high pressure or abnormal cold or heat or with unbearable conditions, how to remotely teach the robotic arm to operate such that the operator can be away from the hazardous working environment has become a prominent task for the industries.

For a robotic arm to be taught from a remote end, the robotic arm normally is equipped with a vision device such as a video recorder or a camera. The vision device shoots an image of the job site of the robotic arm and further transmits the image of the job site to a monitor disposed at a remote end and shows the image of the job site of the robotic arm on the remote-end monitor. The operator views the relative position between the robotic arm and the work piece shown on the monitor robotic arm, and operates a cabled or a wireless remote controller to teach the robotic arm to move, transport or assembly robotic arm the work piece to manufacture products.

For the robotic arm taught by means of remote control, the operation of the remote controller is restrictive, and it is inconvenient to carry the remote controller all the time. Of the prior art, the United States Patent No. US20110118877 "Robot system and method and computer-readable medium controlling the same" discloses a controlling method of the robot system to replace the conventional teaching method using a remote controller. According to the said United States Patent No. US20110118877, the moving direction of the robotic arm is taught according to the moving direction of a detected hand control gesture robotic arm, and the operation becomes more convenient.

According to the prior art, the vision device is merely disposed at the job site outside the robotic arm, and does not move along with the robotic arm. Therefore, when the remote-end monitor reduces the display frame, the operator can only see the overall working environment of the robotic arm but cannot clearly see the direction of the work piece and the relative position between the robotic arm and the work piece. Also, in the prior art, the movement of the robotic arm is controlled according to single-stage gestures. Such control based on single-stages gesture may easily cause the robotic arm to collide with the work piece, and is neither suitable for moving the robot hand to get close to the work piece nor suitable for the fine-tuning purpose such as adjusting the direction of the robot hand to grip the work piece. Therefore, the device and the method for remotely teaching the robotic arm to move still have many problems to resolve.

SUMMARY OF THE INVENTION

According to one embodiment of the present invention, a teaching device for a robotic arm is disclosed. The eye-to-hand vision device and the eye-in-hand vision device are respectively disposed on the robotic arm for capturing the arm ambient image and the hand vicinity image and further showing the captured images at a remote end. Two-stage control gestures comprising an arm control gesture and a hand control gesture are detected and recognized. The arm control gesture is shown alongside with the arm ambient image for controlling the arm unit to move at a high velocity. The hand control gesture is shown alongside with the hand vicinity image for controlling the hand unit to move at a low velocity. Through such design, the operation efficiency can thus be increased.

According to another embodiment of the present invention, a teaching method for a robotic arm is disclosed. By means of the two-stage control gestures, the arm unit is controlled to move at a high velocity in an arm movement mode and the hand unit is controlled to move at a low velocity in a hand movement mode, such that the movement of the robotic arm is precise and accurate.

To achieve the foregoing objects of the invention, a teaching device for a robotic arm is disclosed. The teaching device comprises a robot arm, a control device and a gesture recognition module. The robotic arm has an arm unit and a hand unit. An eye-in-hand vision device is disposed on the arm unit for capturing the hand vicinity image unit disposed at the movement end of the arm unit. An eye-to-hand vision device is disposed at a job site for capturing the ambient image of the robotic arm. The control device is disposed at a remote end for teaching the robotic arm to move and receiving images captured by the eye-in-hand vision device and the eye-to-hand vision device. The control device has a monitor showing a split screen composed of an eye-to-hand frame and an eye-in-hand frame side by side. The eye-to-hand frame shows the arm ambient image captured by the eye-to-hand vision device and has an arm control gesture area showing an image of control gesture. The eye-in-hand frame shows the hand vicinity image captured by the eye-in-hand vision device and has a hand control gesture area showing the image of control gesture. The gesture recognition module is for detecting a control gesture and transmitting the detected control gesture signal to the control device, and showing the image of control gesture in the arm control gesture area or the hand control gesture area.

The teaching device for a robotic arm of the invention comprises a robotic arm, a control device and a gesture recognition module. The gesture recognition module detects a control gesture signal and transmits the detected control gesture signal to the control device. The control device teaches the robotic arm to move and divides the movement mode of the robotic arm into an arm movement mode and a hand movement mode. In the arm movement mode, the control device, aided by an arm ambient image shown on an eye frame and an arm control gesture, teaches an arm unit to move to a target at a high velocity. In the hand movement mode, the control device, aided by a hand vicinity image shown on an eye-in-hand frame and a hand control gesture, teaches a hand unit to move the processing target at a low velocity.

The control gesture of the teaching device for a robotic arm of the invention is preset, and comprises an arm control gesture exclusive to the arm movement mode, a hand control gesture exclusive to the hand movement mode and a basic control gesture common to all movement modes. The basic control gesture comprises a conversion gesture used for activating the conversion movement mode and switching the control device between the arm movement mode and the hand movement mode. The basic control gesture further comprises a wake-up gesture used for waking up the robotic arm and a completion gesture used for terminating the movement mode. The hand control gesture comprises a moving gesture used for driving the hand unit to move and adjust the direction, a gripping gesture used for gripping the processing target, and a releasing gesture used for releasing the processing target.

The teaching method for a robotic arm of the invention comprises following steps: waking up a robotic arm and capturing an arm ambient image and a hand vicinity image shown side by side at a remote end; entering a preset arm movement mode; showing the control gesture alongside with the arm ambient image; detecting an arm control gesture; teaching the arm unit to move to the target at a preset velocity according to the detected arm control gesture; using the control gesture to switch the movement mode to the hand movement mode; showing the control gesture alongside with the hand vicinity image; detecting a hand control gesture; teaching the hand unit to move the processing target at a preset velocity according to the detected hand control gesture; terminating the movement mode.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 3 is a schematic diagram of control gestures for teaching a robotic arm according to an embodiment of the invention.

DETAILED DESCRIPTION OF THE INVENTION

The technologies adopted to achieve the objects of the invention and the effects thereof are disclosed below in a number of exemplarily embodiments with accompanying drawings.

Figure 1:
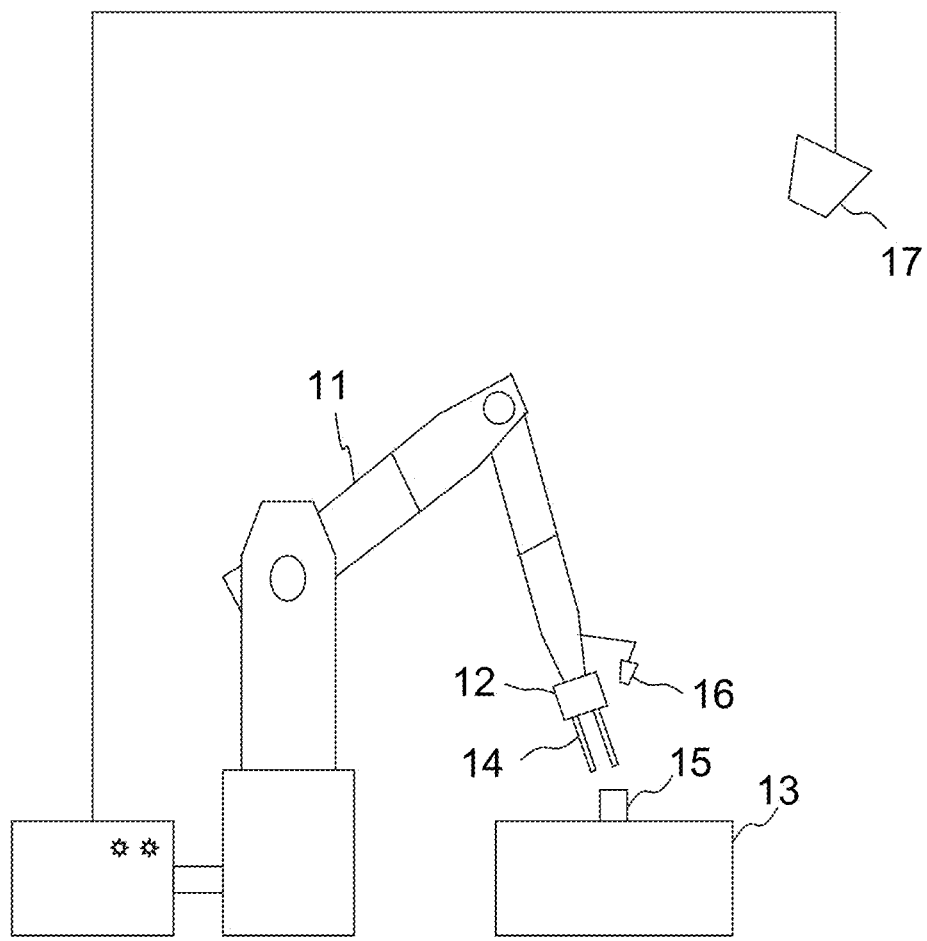
FIG. 1 is a schematic diagram of a robotic arm of a teaching device for a robotic arm according to an embodiment of the invention.
Figure 2:
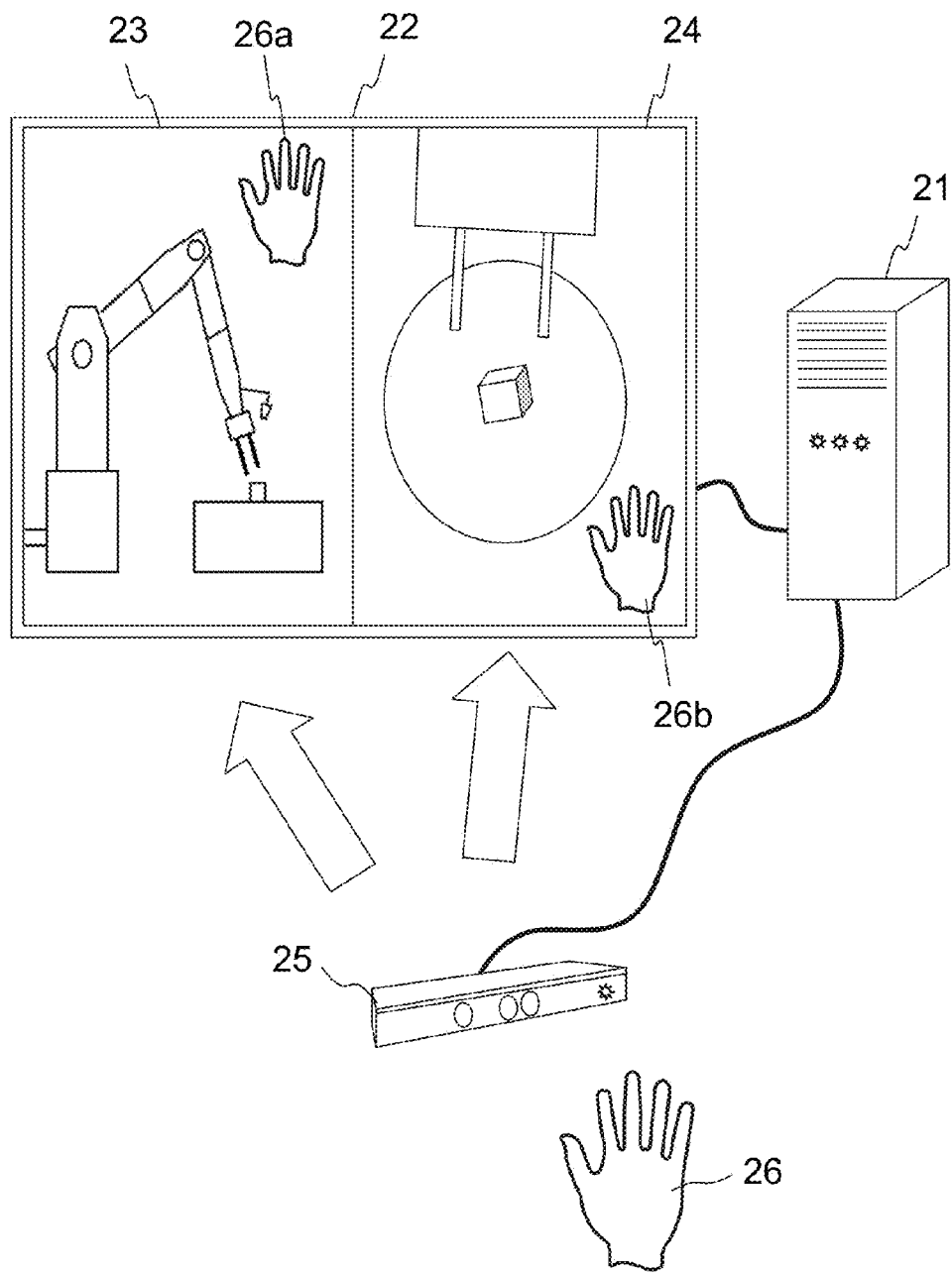
FIG. 2 is a schematic diagram of a control device of a teaching device for a robotic arm according to an embodiment of the invention.

Refer to FIG. 1, FIG. 2 and FIG. 3. FIG. 1 is a schematic diagram of a robotic arm of a teaching device for a robotic arm according to an embodiment of the invention. FIG. 2 is a schematic diagram of a control device of a teaching device for a robotic arm according to an embodiment of the invention. FIG. 3 is a schematic diagram of control gestures for teaching a robotic arm according to an embodiment of the invention. The teaching device for a robotic arm of the invention comprises a robotic arm 10 disposed at a job site and a control device 20 disposed at a remote end. As indicated in FIG. 1, the robotic arm 10 has an arm unit 11 and a hand unit 12 which has a gripping device 14. The robotic arm 10 controls the movement of the arm unit 11, and drives the hand unit 12 disposed at the movement end of the arm unit 11 to move towards or away from a target work bench 13. Then, the gripping device 14 of the hand unit 12 is driven to adjust the direction, grip the work piece 15 located on the work bench 13, or release the work piece 15 placed on the work bench 13.

The robotic arm 10 of the invention is further equipped with a vision device such as a video recorder or a camera for shooting a site image of the robotic arm 10 and further sending the site image to the control device 20 at a remote end by way of cabled or wireless transmission. The vision device comprises an eye-in-hand vision device 16 and an eye-to-hand vision device 17. The eye-in-hand vision device 16 is directly disposed on the arm unit 11. Normally, the eye-in-hand vision device 16 is disposed at a position close to the hand unit 12 and moves along with the arm unit 11 to capture a hand vicinity image unit 12. The eye-to-hand vision device 17 is disposed at the job site outside the robotic arm 10. Normally, the eye-to-hand vision device 17 is fixed at the job site and does not move along with the robotic arm. The eye-to-hand vision device 17 captures an ambient image of the robotic arm 10 operating at the job site.

As indicated in FIG. 2, the control device 20 of the teaching device of the invention has a host 21 which receives images captured by the eye-in-hand vision device 16 and the eye-to-hand vision device 17 and further shows the received images on a monitor 22 side by side. The monitor 22 has a split screen composed of an eye-to-hand frame 23 and an eye-in-hand frame 24. The eye-to-hand frame 23 shows the arm ambient image unit 11 captured by the eye-to-hand vision device 17, and the eye-in-hand frame 24 shows the hand vicinity image unit 12 captured by the eye-in-hand vision device 16. The operator can view the eye-to-hand frame 23 and the eye-in-hand frame 24 at the same time. In the present invention, the split screen is shown on the same monitor 22. However, the images captured by different vision devices can be shown on several monitors and so that the operator can concurrently view the captured images on the monitors.

The control device 20 of the teaching device of the invention further has a gesture recognition module 25 which detects a control gesture 26 of the operator, transmits the signal of the control gesture 26 to the host 21, and shows the control gesture in the arm control gesture area 26a of the eye-to-hand frame 23 or in the hand control gesture area 26b of the eye-in-hand frame 24 according to the teaching audience. The arm control gesture area 26a is shown alongside with the arm ambient image, and the hand control gesture area 26b is shown alongside with the hand vicinity image.

The control device 20 further divides the movement mode for teaching the robotic arm 10 into an arm movement mode and a hand movement mode. In the arm movement mode, the control device 20, aided by the arm ambient image shown on the eye-to-hand frame 23 and the detected arm control gesture shown in the arm control gesture area 26a, teaches the arm unit 11 to move at a high velocity so that the hand unit 12 can quickly reach the target work bench 13. In the hand movement mode, the control device 20, aided by the hand vicinity image shown on the eye-in-hand frame 24 and the detected hand control gesture shown in the hand control gesture area 26b, teaches the hand unit 12 to move at a low velocity so as to accurately adjust the direction, grip or release the work piece 15. Through the control gestures in the arm movement mode and the hand movement mode, two-stage control gestures are formed to teach the arm unit 11 and the hand unit 12 to move.

FIG. 3 shows a number of control gestures 26 for teaching a robotic arm. The control gestures 26 are preset and comprise basic control gesture, arm control gesture and hand control gesture. The basic control gesture, common to all movement modes, comprises a wake-up gesture, a conversion gesture and a completion gesture. The wake-up gesture is an opened hand and is used for waking up the robotic arm 10. The wake-up gesture is shown in the arm control gesture area 26a of the eye-to-hand frame 23 to make the operator understand that the control device 20 already enters the arm movement mode to control the movement of the arm unit 11. The conversion gesture is a closed hand with the thumb and the index finger being stretched out. The conversion gesture is used for activating the conversion movement mode and enables the control device 20 to be switched between the arm movement mode and the hand movement mode. The conversion gesture will be shown in the post-conversion frame to let the operator understand that the control device 20 is already converted to another movement mode. The completion gesture is a closed hand with the middle finger and the index finger stretched out. The completion gesture is used for terminating the movement mode of the control device 20 of the invention, and the control gesture in the eye-to-hand or the eye-in-hand frame will disappear to let the operator understand that the control device 20 has completed the operation of the movement mode.

The arm control gesture, exclusive to the arm movement mode, is an opened hand moving up and down and to both sides. The arm control gesture is used for moving the arm unit 11 in the arm movement mode, and is merely shown in the arm control gesture area 26a of the eye-to-hand frame 23. The hand control gesture, exclusive to the hand movement mode, comprises a moving gesture, a gripping gesture and a releasing gesture. The hand control gesture is used for moving the hand unit 12 in the arm movement mode, and is merely shown in the hand control gesture area 26b of the eye-in-hand frame 24. The moving gesture is a clenched fist moving up and down and to both sides. The moving gesture is used for moving the hand unit 12 to adjust the direction in the hand movement mode. The gripping gesture is a half-opened hand with the thumb being separated from four adjoining fingers. The gripping gesture is used for moving the gripping device 14 of the hand unit 12 to grip the work piece in the hand movement mode. The releasing gesture is an opened hand. The releasing gesture is used for opening the gripping device 14 of the hand unit 12 to release the work piece in the hand movement mode.

When the teaching device for a robotic arm of the invention is in use, firstly, the operator shows a wake-up gesture. After detecting and recognizing the wake-up gesture, the gesture recognition module 25 transmits a signal to the host 21. Then, the host 21 wakes up the robotic arm 10 and transmits the images captured by the eye-in-hand vision device 16 and the eye-to-hand vision device 17 respectively to the eye-to-hand frame 23 and the eye-in-hand frame 24 of the monitor 22. Then, the teaching device enters the arm movement mode, and shows the wake-up gesture in the arm control gesture area 26a of the eye-to-hand frame 23 and the arm ambient image to indicate that the teaching device has entered a wake-up state.

Then, the operator views the position of the arm unit 11 in the eye-to-hand frame 23. Normally, the arm unit 11 is farther away from the target work bench 13. Then, the operator shows an arm control gesture. After the arm control gesture is detected and recognized by the gesture recognition module 25, the arm control gesture is shown in the arm control gesture area 26a of the eye-to-hand frame 23. Meanwhile, the operator views the arm ambient image in the eye-to-hand frame 23, and controls the arm unit 11 to quickly move at a high velocity, such that the hand unit 12 disposed at the movement end of the arm unit 11 can quickly reach the target work bench 13 until the image of the target work bench 13 is shown in the eye-in-hand frame 24.

To avoid the arm unit 11 moving at a high velocity colliding with the work piece 15 and to fine-tune the hand unit 12 to a suitable direction, the operator uses a conversion gesture to switch the control device 20 of the invention to the hand movement mode. After the conversion gesture is detected and recognized by the gesture recognition module 25, the conversion gesture is shown in the hand control gesture area 26b of the eye-in-hand frame 24 to indicate that the control device 20 has entered the hand movement mode. Then, the operator shows a moving gesture of the hand control gestures. After the moving gesture is detected and recognized by the gesture recognition module 25, the moving gesture is shown in the hand control gesture area 26b of the eye-in-hand frame 24. The operator views the hand unit 12 in the eye-in-hand frame 24, controls the hand unit 12 to move at a low velocity, and fine-tunes the hand unit 12 to a suitable direction. Then, the operator shows a gripping gesture of the hand control gestures. After the gripping gesture is detected and recognized by the gesture recognition module 25, the gripping gesture is shown in the hand control gesture area 26b of the eye-in-hand frame 24, and the gripping device 14 of the hand unit 12 grips the work piece 15 placed on the target work bench 13. Or, the operator shows a releasing gesture of the hand control gestures. After the releasing gesture is detected and recognized by the gesture recognition module 25, the releasing gesture is shown in the hand control gesture area 26b of the eye-in-hand frame 24, and the gripping device 14 of the hand unit 12 releases and places the work piece 15 on the target work bench 13.

In the arm movement mode and the hand movement mode, based on the distance to the work piece and the adjustment direction of the work piece, the conversion gesture can be used to switch the movement mode, and two-stage control gestures can be shown on the frame, such that the hand unit 12 can quickly reach the target at two-stage velocities in response to different positions until the movement of the robotic arm 10 is completed. Lastly, the operator shows a completion gesture. After the completion gesture is detected and recognized by the gesture recognition module 25, the arm control gesture 26 in the eye-to-hand frame 23 or the eye-in-hand frame 24 is deleted to complete the movement mode of the teaching device for a robotic arm of the invention.

According to the teaching device for a robotic arm of the invention disclosed above, an eye-in-hand vision device 16 and an eye-to-hand vision device 18 disposed on the robotic arm 10 respectively show the hand vicinity image in the eye-in-hand frame 24 and the arm ambient image in the eye-to-hand frame 23 at a remote end. By means of the two-stage control gestures, the arm unit is controlled to move towards the target at a high velocity in the eye-to-hand frame 23 and the hand unit is controlled to move at a low velocity to grip or release the work piece in the eye-in-hand frame 24. Through such design, the operation efficiency can thus be increased.

Figure 4:
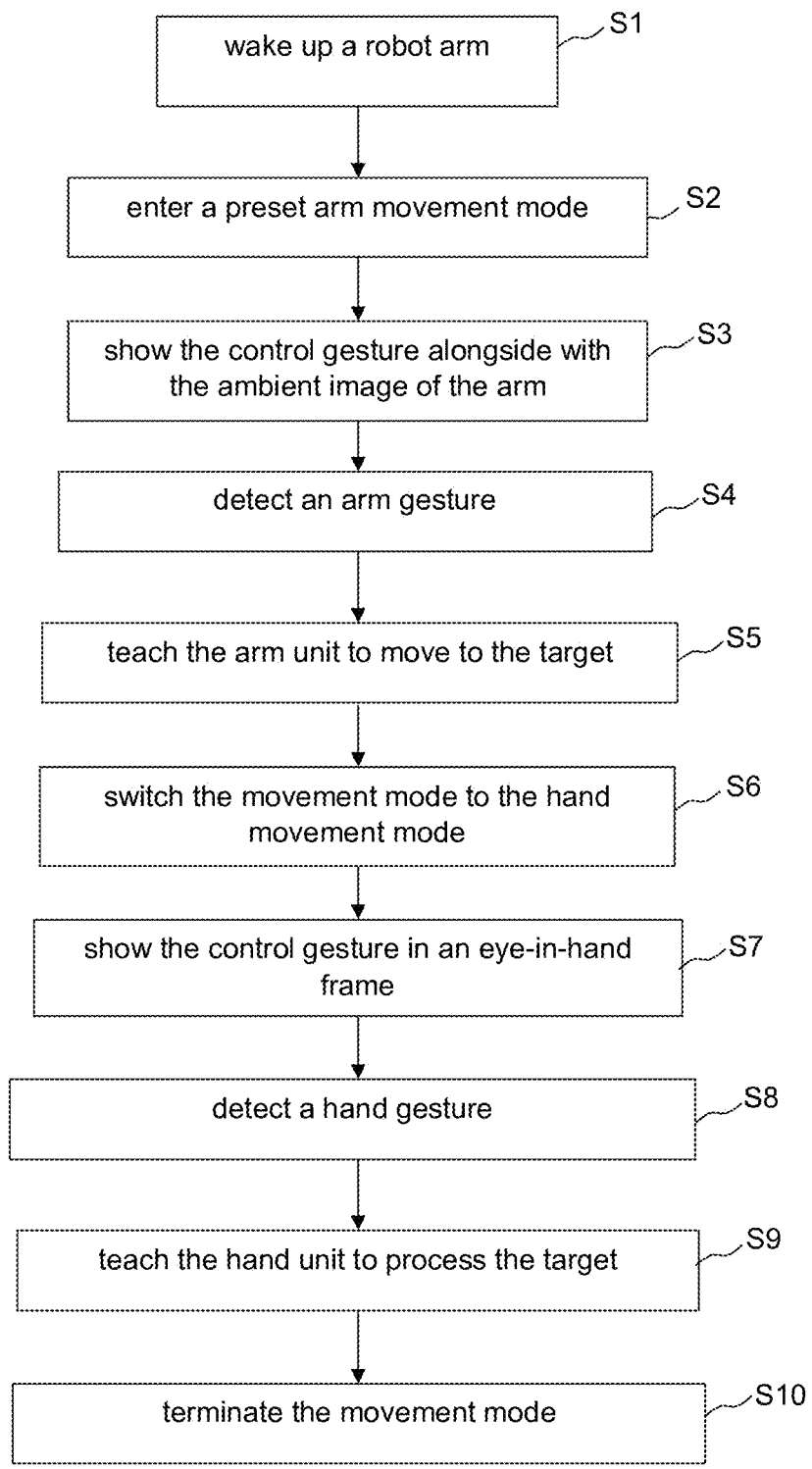
FIG. 4 is a flowchart of a teaching method for a robotic arm according to an embodiment of the invention.

Referring to FIG. 4, a flowchart of a teaching method for a robotic arm according to an embodiment of the invention is shown. Details of the teaching method for a robotic arm at a remote end are as follows. Firstly, the method begins at step S1, a control gesture is used for waking up a robotic arm and capturing an arm ambient image and a hand vicinity image shown side by side at a remote end. Next, the method proceeds to step S2, the teaching device enters a preset arm movement mode. Then, the method proceeds to step S3, the control gesture is shown alongside with the arm ambient image. Then, the method proceeds to step S4, an arm control gesture is detected. Then, the method proceeds to step S5, the arm unit is taught to move to the target at a preset velocity according to the detected arm control gesture, wherein the movement of the arm unit is set at a high velocity faster than the movement velocity of the hand unit, and if the target is shown in the hand vicinity image, it can be judged that the hand unit is already moved to the target. Then, the method proceeds to step S6, a control gesture is used for switching the movement mode to the hand movement mode. Then, the method proceeds to step S7, the control gesture is shown alongside with the hand vicinity image. Then, the method proceeds to step S8, a hand control gesture is detected. Then, the method proceeds to step S9, the hand unit is taught to move the processing target (for example, to grip or release the work piece) at a preset low velocity according to the detected hand control gesture. Lastly, the method proceeds to step S10, after the processing of the target is completed, the movement mode of the invention terminates.

Therefore, by detecting two-stage control gestures for controlling the arm unit to move at a high velocity in an arm movement mode and controlling the hand unit to move the processing target at a low velocity in the hand movement mode, the teaching method for a robotic arm of the invention can teach the robotic arm to move with high precision.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A robotic arm controlling device for controlling a robotic arm that is disposed at a job site and comprises an arm unit and a hand unit, wherein an eye-in-hand vision device is disposed on the arm unit for capturing a hand vicinity image at a movement end of the arm unit, and an eye-to-hand vision device is disposed at the job site for capturing an ambient image of the robotic arm, the robotic arm controlling device comprising:

a control device disposed at a remote end for moving the robotic arm and receiving images captured by the eye-in-hand vision device and the eye-to-hand vision device, wherein the control device has a monitor showing an eye-to-hand frame and an eye-in-hand frame side by side, wherein the eye-to-hand frame shows an arm ambient image captured by the eye-to-hand vision device and has an arm control gesture area showing an image of control gesture, wherein the eye-in-hand frame shows the hand vicinity image captured by the eye-in-hand vision device and has a hand control gesture area showing the image of control gesture;

a gesture recognition device for detecting a control gesture and transmitting a detected control gesture signal to the control device, and showing the image of control gesture in the arm control gesture area or the hand control gesture area; and wherein the control device receives the control gesture signal detected by the gesture recognition device, moves the robotic arm, and divides a movement mode of the robotic arm controlling device for the robotic arm into an arm movement mode and a hand movement mode, wherein in the arm movement mode, the control device aided by the arm ambient image shown on the eye-to-hand frame and an arm control gesture moves the arm unit to a target at a high velocity, wherein in the hand movement mode, the control device aided by the hand vicinity image shown on the eye-in-hand frame and a hand control gesture moves the hand unit to the target at a low velocity.

2. The robotic arm controlling device for a robotic arm according to claim 1, wherein the control gesture is preset, and the control gesture comprises the arm control gesture exclusive to the arm movement mode; a hand control gesture exclusive to the hand movement mode; and a basic control gesture common to both the arm movement mode and the hand movement mode.

3. The robotic arm controlling device for a robotic arm according to claim 2, wherein the basic control gesture activates a conversion movement mode, and enables the control device to be switched between the arm movement mode and the hand movement mode.

4. The robotic arm controlling device for a robotic arm according to claim 3, wherein the basic control gesture further wakes up the robotic arm and terminates the movement mode.

5. The robotic arm controlling device for a robotic arm according to claim 2, wherein the hand control gesture drives the hand unit to adjust an orientation, grips the target and releases the target.

6. The robotic arm controlling device for a robotic arm according to claim 1, wherein the eye-to-hand frame and the eye-in-hand frame are provided on a split screen of the monitor.

* * * * *